(12) United States Patent
Xu et al.

(10) Patent No.: US 11,822,548 B2
(45) Date of Patent: Nov. 21, 2023

(54) DATA WAREHOUSE FRAMEWORK FOR HIGH PERFORMANCE REPORTING

(71) Applicant: International Business Machines Corporation, Armonk, NY (US)

(72) Inventors: Jijiang (George) Xu, Ottawa (CA); Hendrik Cazemier, Spencerville (CA); Ralf Vierich, Ottawa (CA); Qing Zhu, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 17/544,010

(22) Filed: Dec. 7, 2021

(65) Prior Publication Data

US 2023/0177049 A1 Jun. 8, 2023

(51) Int. Cl.
G06F 16/2453 (2019.01)
G06F 16/22 (2019.01)
G06F 11/34 (2006.01)

(52) U.S. Cl.
CPC .... *G06F 16/24539* (2019.01); *G06F 11/3419* (2013.01); *G06F 16/2228* (2019.01)

(58) Field of Classification Search
CPC .......... G06F 16/24539; G06F 11/3419; G06F 16/2228
See application file for complete search history.

(56) References Cited

U.S. PATENT DOCUMENTS

| | | | |
|---|---|---|---|
| 7,440,963 B1 * | 10/2008 | Bello | G06F 16/24539 |
| 7,720,804 B2 | 5/2010 | Fazal et al. | |
| 8,271,430 B2 | 9/2012 | Willson | |
| 2007/0214107 A1 * | 9/2007 | Bello | G06F 16/24539 |
| 2014/0280259 A1 | 9/2014 | McGillin et al. | |

(Continued)

OTHER PUBLICATIONS

Mazon et al., "A Hybrid Model Driven Development Framework for the Multidimensional Modeling of Data Warehouses," Special Interest Group on Management of Data (SIGMOD) Record, vol. 38, No. 2, Jun. 2009, pp. 12-17.

(Continued)

*Primary Examiner* — Cam-Y T Truong
(74) *Attorney, Agent, or Firm* — SHACKELFORD, BOWEN, MCKINLEY & NORTON, LLP; Robert A. Voigt, Jr.

(57) ABSTRACT

A computer-implemented method, system and computer program product for improving performance for retrieving and reporting information from a data warehouse. A query (e.g., SQL query) is received. If a materialized view is present, and if such a materialized view was generated within the designated time frame, then the query is translated to query a materialized view. The translated query is then sent to a first data storage database of the data warehouse storing materialized views to be processed to obtain the materialized object associated with the query. If, on the other hand, the materialized view is not present, or the materialized view is present but has not been generated within the designated time frame, then the query is sent to the second data storage database of the data warehouse storing the original data without any modification to retrieve and report the appropriate information from the second data storage database.

20 Claims, 5 Drawing Sheets

(56) References Cited

U.S. PATENT DOCUMENTS

| | | | | |
|---|---|---|---|---|
| 2015/0058308 | A1* | 2/2015 | Zheng | G06F 16/951 |
| | | | | 707/706 |
| 2018/0165343 | A1* | 6/2018 | Fan | G06F 16/273 |
| 2020/0151154 | A1* | 5/2020 | Kumar | G06F 16/211 |
| 2020/0265049 | A1* | 8/2020 | da Trindade | G06F 16/24545 |

OTHER PUBLICATIONS

Iqbal Ahmed Alvi, "Metadata-Driven Data Warehouse: How it is Revolutionizing Business," https://www.tmcnet.com/topics/articles/2021/02/26/448152-metadata-driven-data-warehouse-how-it-revolutionizing-business.htm, Feb. 26, 2021, pp. 1-4.

Kumar et al., "Materialised View Construction in Data Warehouse for Decision Making," International Journal of Business Information Systems, vol. 11, No. 4, 2012, pp. 379-396.

Boukra et al., "Selection of Views to Materialize in Data Warehouse: A Hybrid Solution," International Journal of Computational Intelligence Research, vol. 3, No. 4, 2007, pp. 327-334.

Athanasios Vavouras, "A Metadata-Driven Approach for Data Warehouse Refreshment," Dissertation, University of Zurich, Switzerland, Feb. 2002, pp. 1-181.

\* cited by examiner

DATA WAREHOUSE FRAMEWORK FOR HIGH PERFORMANCE REPORTING

TECHNICAL FIELD

The present disclosure relates generally to data warehouses, and more particularly to a data warehouse framework for high performance reporting.

BACKGROUND

In computing, a data warehouse, also known as an enterprise data warehouse, is a system used for reporting and data analysis and is considered a core component of business intelligence. Data warehouses are central repositories of integrated data from one or more disparate sources. They store current and historical data in one single place that are used for creating analytical reports for workers throughout the enterprise.

SUMMARY

In one embodiment of the present disclosure, a computer-implemented method for improving performance for retrieving and reporting information from a data warehouse comprises receiving a query. The method further comprises translating the query to query a materialized view in response to a presence of the materialized view and in response to the materialized view being generated within a designated time frame. The method additionally comprises sending the translated query to a first data storage of the data warehouse to be processed to obtain a materialized object associated with the query in response to the presence of the materialized view and in response to the materialized view being generated within the designated time frame. Furthermore, the method comprises sending the query to a second data storage of the data warehouse to be processed in response to a lack of the presence of the materialized view or in response to the materialized view not being generated within the designated time frame.

Other forms of the embodiment of the computer-implemented method described above are in a system and in a computer program product.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
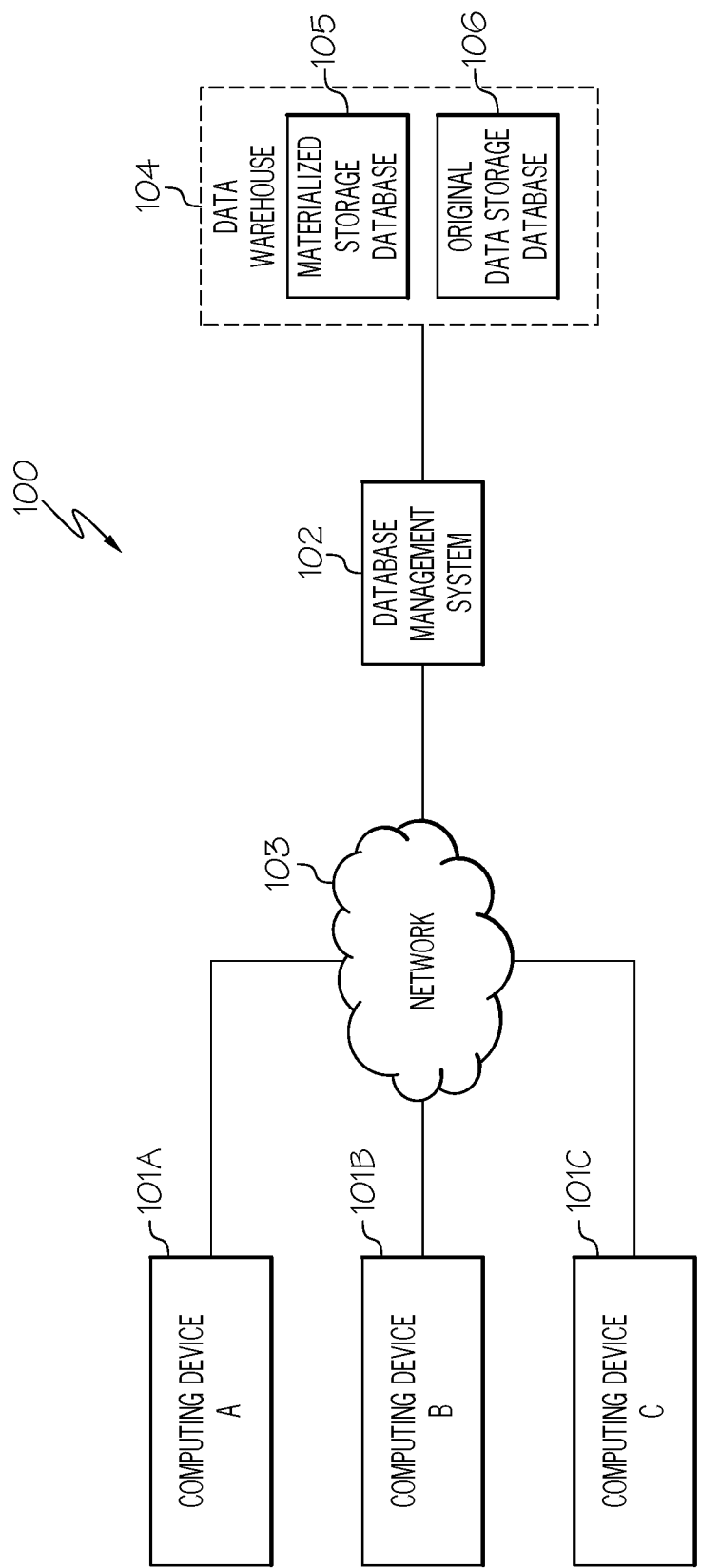
FIG. 1 illustrates a communication system for practicing the principles of the present disclosure in accordance with an embodiment of the present disclosure.

As stated in the Background section, in computing, a data warehouse, also known as an enterprise data warehouse, is a system used for reporting and data analysis and is considered a core component of business intelligence. Data warehouses are central repositories of integrated data from one or more disparate sources. They store current and historical data in one single place that are used for creating analytical reports for workers throughout the enterprise.

Such information stored in databases of a data warehouse may be retrieved and reported using a metadata model, in which the metadata model points directly to the operational and relational data source. The metadata model may consist of three layers (views) representing increasing levels of abstraction of the underlying report data. One such view is the database view, which directly represents the data as it appears in the data warehouse. The database of the data warehouse is queried by "data source query subjects," which map directly to structured query language (SQL) queries on the database. Such query subjects are defined by SQL statements that describe how to retrieve data from the data source. In the user interface, lines that link data source query subjects show relationships and cardinality between query subjects.

Another layer is the model view, which is a more abstract way of interacting with the data. In such a view, the model view uses "model query subjects" to combine data source query subjects into informational chunks more easily accessible to a business user.

A further layer is the dimensional view, which is an abstraction layer providing the highest-level view of reporting data, targeted at business users.

The data source and model query subject contain query items, which can be used to retrieve identifiers, facts (e.g., metric, measure, indicator or other data that can be aggregated, such as sales numbers), attributes (provide the context in which the facts can be usefully viewed, such as time or location), and reports (composed of combinations of facts and attributes, for example: sales (fact) per month (month is an attribute of the time dimension)).

Furthermore, in such a model (metadata model), the model usually consists of multiple queries in order to report "real-time" data. For example, in order to report real-time data, the metadata definition has to be prepared at runtime which requires repeatedly complex query planning, execution and retrieval.

Additionally, in such a model (metadata model), a star schema may be used to develop the data warehouse. The star schema consists of one or more fact tables referencing any number of dimension tables.

The star schema separates business process data into facts, which hold the measurable, quantitative data about a business, and dimensions which are descriptive attributes related to fact data. Examples of fact data include sales price, sale quantity, and time, distance, speed and weight measurements. Related dimension attribute examples include product models, product colors, product sizes, geographic locations, and salesperson names.

Fact tables record measurements or metrics for a specific event. Fact tables generally consist of numeric values, and foreign keys to dimensional data where descriptive information is kept. Fact tables are designed to a low level of uniform detail (referred to as "granularity" or "grain"), meaning facts can record events at a very atomic level. This can result in the accumulation of a large number of records in a fact table over time. Fact tables are generally assigned a key to ensure each row can be uniquely identified.

Dimension tables usually have a relatively small number of records compared to fact tables, but each record may have a very large number of attributes to describe the fact data. Dimensions can define a wide variety of characteristics, but some of the most common attributes defined by dimension tables include: time dimension tables which describe time at the lowest level of time granularity for which events are recorded in the star schema; geography dimension tables which describe location data, such as country, state, or city; product dimension tables which describe products; employee dimension tables which describe employees, such as sales people; and range dimension tables which describe ranges of time, dollar values or other measurable quantities to simplify reporting. Dimension tables are generally assigned a key, usually a single-column integer data type, mapped to the combination of dimension attributes that form the natural key.

To improve the performance of retrieving and reporting information stored in the databases of the data warehouse using the metadata model, an extract, transform and load (ETL) process may be used to extract, transform and load data into the star schema, especially for data that does not change that much. The ETL process is a general procedure of copying data from one or more sources into a destination system which represents the data differently from the source(s) or in a different context than the source(s). Data extraction involves extracting data from homogeneous or heterogeneous sources; data transformation involves processing data by data cleaning and transforming it into a proper storage format/structure for the purposes of querying and analysis; finally, data loading describes the insertion of data into the final target database, such as a database of the data warehouse.

Over the years, enterprises or organizations have developed relational data warehouses using the metadata model and star schema as discussed above without utilizing the ETL process. One of the reasons that enterprises or organizations have not utilized the ETL process is due to the investment cost. As a result of not utilizing the ETL process though, performance of retrieving and reporting information stored in the databases of the data warehouse has suffered.

Unfortunately, there is not currently a data warehouse framework for high performance reporting of data stored in the data warehouse without requiring the investment of the ETL process.

The embodiments of the present disclosure provide a means for enabling a data warehouse framework for high performance reporting of data stored in the data warehouse without requiring the investment of the ETL process.

In some embodiments of the present disclosure, the present disclosure comprises a computer-implemented method, system and computer program product for improving performance for retrieving and reporting information from a data warehouse. In one embodiment of the present disclosure, a query (e.g., SQL query) is received. A determination is then made as to whether a materialized view is present and, if so, if the materialized view was generated within a designated time frame (e.g., generated within the past 30 days), which may be user-specified. A "materialized view" (or "materialized object"), as used herein, is a database object that contains the results of a query. For example, it may be a local copy of data located remotely or may be a subset of the rows and/or columns of a table or join result or may be a summary using an aggregate function. In one embodiment, the presence of a materialized view is determined based on matching the received query (such as the query subject) and/or the metadata of the received query (e.g., identifier, facts, attributes) with the query (such as the query subject) and/or metadata stored in a database (referred to herein as the "materialized storage database") of the data warehouse that stores materialized views associated with such stored queries and/or metadata. If a materialized view is present, and if such a materialized view was generated within the designated time frame, then the query is translated to query a materialized view. In one embodiment, such a translation involves translating the virtual fact query (translating the fact data of the query, such as sales price, sale quantity, etc.) into a materialized view definition. The translated query is then sent to the materialized storage database to be processed to obtain the materialized object associated with the query. If, on the other hand, the materialized view is not present, or the materialized view is present but has not been generated within the designated time frame, then the query is sent to the data storage database of the data warehouse (referred to herein as the "original data storage database"), which stores the original data, to be processed. In such a scenario, the query (e.g., SQL request) is sent directly to the actual database tables of the original data storage database without any modification to retrieve and report the appropriate information from the original data storage database. In this manner, a data warehouse framework for high performance reporting of data stored in the data warehouse without requiring the investment of the ETL process is provided.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill in the relevant art.

Referring now to the Figures in detail, FIG. 1 illustrates an embodiment of the present disclosure of a communication system 100 for practicing the principles of the present disclosure. Communication system 100 includes computing devices 101A-101C (identified as "Computing Device A," "Computing Device B," and "Computing Device C," respectively, in FIG. 1) connected to a database management system (DBMS) 102 (e.g., Structured Query Language (SQL) server, data access server) via a network 103. Computing devices 101A-101C may collectively or individually be referred to as computing devices 101 or computing device 101, respectively. It is noted that both computing devices 101 and the users of computing devices 101 may be identified with element number 101.

Computing device 101 may be any type of computing device (e.g., portable computing unit, Personal Digital Assistant (PDA), laptop computer, mobile device, tablet personal computer, smartphone, mobile phone, navigation device, gaming unit, desktop computer system, workstation, Internet appliance and the like) configured with the capability of connecting to network 103 and consequently communicating with other computing devices 101 and database management system 102.

Network 103 may be, for example, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present disclosure.

In one embodiment, the user of computing device 101 issues a query (e.g., SQL query) to database management system 102 (e.g., SQL server) which includes "data source query subjects" which map directly to SQL queries. Such query subjects are defined by SQL statements that describe how to retrieve data from the data source. In one embodiment, such query subjects are based on metadata obtained from the metadata model which are defined by SQL statements that describe how to retrieve data from the data source. Such queries are utilized by database management system 102 to query the databases of data warehouse 104 in order to retrieve and report the appropriate information, such as via the metadata model, from the databases of data warehouse 104 connected to database management system 102.

In one embodiment, data warehouse 104 is a central repository of integrated data from one or more disparate sources. In one embodiment, data warehouse 104 stores both current and historical data in one single place that are used for creating analytical reports for workers throughout an enterprise.

As shown in FIG. 1, data warehouse 104 may include various databases, including a database referred to herein as the "materialized storage database" 105 and an "original data storage database" 106. While FIG. 1 illustrates two separate databases in data warehouse 104, it is noted that data warehouse 104 may include any number of databases, including any number of materialized storage databases 105 and original data storage databases 106.

Materialized storage database 105, as used herein, refers to a database that stores "materialized views" (or "materialized objects"). A "materialized view" (or "materialized object"), as used herein, is a database object that contains the results of a query. For example, it may be a local copy of data located remotely or may be a subset of the rows and/or columns of a table or join result or may be a summary using an aggregate function.

In one embodiment, the process of setting up a materialized view is called "materialization," which is a form of caching the results of a query. Such materialized views are utilized for performance reasons (optimization).

In one embodiment, with respect to a materialized view, the query result is cached as a concrete ("materialized") table (rather than a view as such) that may be updated from the original base tables from time to time. This enables much more efficient access, especially in data warehousing scenarios, where frequent queries of the actual base tables of the databases can be expensive. In one embodiment, in a materialized view, indexes can be built on any column.

Original data storage database 106, as used herein, refers to a database that stores the original data, which may be referenced via an index and keys as discussed further below.

Referring to database management system 102 of system 100, in one embodiment, database management system 102 is configured to populate materialized storage database 105 with materialized views (materialized objects). In one embodiment, database management system 102 populates database 105 based on queries issued by computing devices 101 that include data source query subjects. Such data source query subjects may identify a query subject to be materialized, such as a query item, calculations and filters. In one embodiment, database management system 102 is configured to generate a native database query (e.g., native SQL) based on the received query, which is then sent to a replication service of database management system 102. The replication service may then construct a materialized view based on the native database query. The materialized view associated with the query received from computing device 101 is then stored in materialized storage database 105. In one embodiment, the materialized view is stored in database 105 along with the associated query (e.g., query subject of the query) and/or the metadata (e.g., identifiers, facts, attributes) of the query. Upon receiving a subsequent query, and such a query is associated with a materialized view stored in materialized storage database 105, then database management system 102 may simply retrieve such a materialized view from database 105 providing the results of the query in a more efficient, quicker manner.

Alternatively, if the identified query subject to be materialized is not supported with materialize views, then the replication service of database management system 102 retrieves the metadata information pertaining to the query subject from the metadata model using the native database query. Such metadata information may include identifiers, facts (e.g., metrics, measures, indicators or other data that can be aggregated, such as sales numbers), attributes (provides the context in which facts can be usefully viewed, such as time or location), etc. Furthermore, in connection with such metadata information, database management system 102 retrieves the result of the query, such as a report composed of a combination of facts and attributes from the metadata information, which is stored in original data storage database 106. Such data (e.g., report composed of a combination of facts and attributes) is identified in original data storage database 106 using the index and keys generated by the replication service. A key is used to uniquely identify a row in a table of database 106. An index is used to sort or group the rows in the table of database 106.

A more detailed description of these and other features will be provided below. Furthermore, a description of the software components of database management system 102 is provided below in connection with FIG. 2 and a description of the hardware configuration of database management system 102 is provided further below in connection with FIG. 3.

System 100 is not to be limited in scope to any one particular network architecture. System 100 may include any number of computing devices 101, database management systems 102, networks 103 and data warehouses 104.

A discussion regarding the software components used by database management system 102 for improving the performance of the reporting of data stored in the data warehouse without requiring the investment of the ETL process is provided below in connection with FIG. 2.

Figure 2:
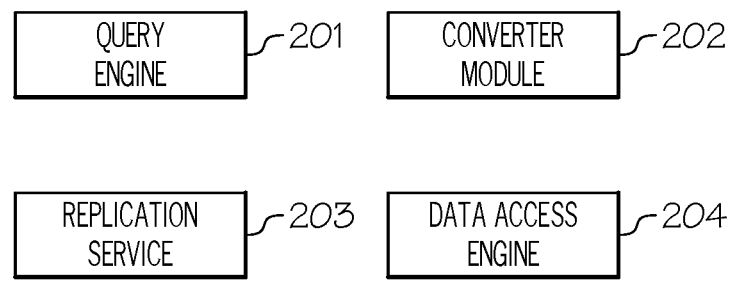
FIG. 2 is a diagram of the software components of the database management system for improving the performance of the reporting of data stored in the data warehouse without requiring the investment of the ETL process in accordance with an embodiment of the present disclosure.

FIG. 2 is a diagram of the software components of database management system 102 (FIG. 1) for improving the performance of the reporting of data stored in the data warehouse without requiring the investment of the ETL process in accordance with an embodiment of the present disclosure.

Referring to FIG. 2, in conjunction with FIG. 1, database management system 102 includes a query engine 201 configured to receive a query from computing device 101. In one embodiment, such a query may include a data source query subject (or simply referred to herein as "query subject") which is identified to be materialized by query engine 201. A "query subject," as used herein, is defined by SQL statements that describe how to retrieve data from the data source. In one embodiment, such query subjects directly reference data in a single data source.

In one embodiment, a query subject is a set of query items that have an inherent relationship. A query item is the smallest object in the model that can be placed in a report. It represents a single instance of something, such as the date that a product was introduced.

In one embodiment, query subjects may be modified to optimize and customize the data that they retrieve by adding filters, determinants or relationships.

In one embodiment, query engine 201 identifies the data source query subject to be materialized using various software tools, including, but not limited to, Cognos® Analytics, Oracle® Analytics, Sisense®, Zoho Analytics®, etc.

Database management system 102 further includes a converter module 202 configured to generate a native database query (e.g., native SQL) based on the query received by query engine 201. A "native database query," as used herein, refers to the actual SQL queries (referring to the actual database objects). Such native database queries are the SQL statements which can be directly executed in the database of data warehouse 104.

In one embodiment, converter module 202 converts the query received by query engine 201 into a native database query using various software tools, including, but not limited to, Power BI®, Cognos® Analytics, Oracle® Business Intelligence Enterprise Edition, Sisense Fusion® Analytics, etc.

In one embodiment, converter module 202 sends the native database query to a replication service 203 of database management system 102.

In one embodiment, replication service 203 is configured to replicate or copy data to be retrieved and reported. In one embodiment, replication service 203 determines whether the query subject identified to be materialized is supported with materialized views. Such a determination is based on the query subject which describes how to retrieve data from the data source. Such a query subject may contain statements (e.g., clauses, object types, column aliases, etc.) which may or may not be supported with materialized views. For example, logging_clause, table_compression, and table_partitioning_clause are supported with materialized views; whereas, index_org_table_clause, object_type_col_properties and LOB_storage_clause are not supported with materialized views. In one embodiment, a listing of statements along with an indication as to whether they are or are not supported with materialized views is stored in a data structure (e.g., table). In one embodiment, replication service 203 performs a look-up in such a data structure using natural language processing for terms that match the statements in the query. Upon identifying such a match in the data structure, replication service 203 then determines whether such statements are supported with materialized views. In one embodiment, such a data structure is populated by an expert. In one embodiment, such a data structure is stored in a storage device (e.g., memory, disk unit) of database management system 102.

Replication service 203 utilizes various software tools to make such a determination including, but not limited to, Cognos® Analytics, Oracle® Analytics, Sisense®, Zoho Analytics®, etc.

If the query subject to be materialized is supported with materialized views, then replication service 203 constructs a materialized view based on the native database query generated by converter module 202. As previously discussed, a "materialized view" (or "materialized object"), as used herein, is a database object that contains the results of a query. For example, it may be a local copy of data located remotely or may be a subset of the rows and/or columns of a table or join result or may be a summary using an aggregate function. As a result, replication service 203 is configured to obtain the results of the query received by query engine 201 from computing device 101, such as by having the native database query executed by the database (e.g., database 106) of data warehouse 104. For example, the native database query may consist of SQL statements which are then executed by the database (e.g., database 106) of data warehouse 104. Upon obtaining the results from executing the native database query, such results are then contained in a database object (materialized object) by replication service 203.

In one embodiment, replication service 203 constructs such a materialized view using various software tools, including, but not limited to, Cognos® Analytics, Oracle® Analytics, Sisense®, Zoho Analytics®, FlexViews, etc.

In one embodiment, the query result contained in a database object (materialized object) is then stored in materialized storage database 105 by replication service 203 to enable a more efficient access, especially in data warehousing scenarios, where frequent queries of the actual base tables of the databases can be expensive. That is, by storing such materialized views in materialized storage database 105, the results of the query received by query engine 201 from computing device 101 may be retrieved and reported in a more efficient, quicker manner for those queries where a materialized view is present. In this manner, the complex query planning of the metadata model is avoided. Furthermore, the ETL investment is avoided by essentially reverse engineering the ETL logic from the metadata model.

Alternatively, if the identified query subject to be materialized is not supported with materialized views, then replication service 203 retrieves the metadata information pertaining to the query subject from the metadata model using the native database query. Such metadata information may include identifiers, facts (e.g., metrics, measures, indicators or other data that can be aggregated, such as sales numbers), attributes (provides the context in which facts can be usefully viewed, such as time or location), etc. In one embodiment, such metadata information is obtained by replication service 203 calling a method, such as "get MetaData( ) method," where such metadata is stored in a data dictionary or system catalog of the metadata model.

Furthermore, in connection with such metadata information, replication service 203 retrieves the result of the query, such as a report composed of a combination of facts and attributes from the metadata information, which is stored in original data storage database 106. Such data (e.g., report composed of a combination of facts and attributes) is identified in original data storage database 106 using the index and keys generated by replication service 203. A key is used to uniquely identify a row in a table of database 106.

An index is used to sort or group the rows in the table of database 106. In one embodiment, replication service 203 retrieves the metadata information from the metadata model, generates an index and keys as well as inserts the results of the query into original data storage database 106 using various software tools, including, but not limited to, Cognos® Analytics, Oracle® Analytics, Sisense®, Zoho Analytics®, MySQL®, etc. In one embodiment, such indexes and keys can be generated by replication service 203 using SQL statements, such as the SQL Create Index statement and the SQL Primary Key statement.

Furthermore, database management system 102 includes a data access engine 204 configured to determine if the query (e.g., SQL query) received by query engine 201 from computing device 101 has a materialized view present, and if so, if such a material view was generated with a designated time frame (e.g., generated within the past 30 days).

In one embodiment, data access engine 204 is configured to determine if a materialized view is present in materialized storage database 105 based on matching the received query (such as the query subject) and/or the metadata of the received query (e.g., identifier, facts, attributes) with the query and/or metadata stored in database 105 that is associated with previously stored materialized views. As previously discussed, such metadata may be obtained from the metadata model. Furthermore, as previously discussed, materialized views may be stored in materialized storage database 105 along with its associated query (e.g., query subject) and/or metadata of such a query. By matching the query (e.g., query subject) and/or metadata of the received query with such stored queries or metadata, the associated materialized views may be identified. In one embodiment, such matching may be accomplished by data access engine 204 using natural language processing.

In one embodiment, data access engine 204 identifies the query subject of the query using various software tools, including, but not limited to, Cognos® Analytics, Oracle® Analytics, Sisense®, Zoho Analytics®, etc. Furthermore, in one embodiment, data access engine 204 is configured to identify the metadata of the query by calling a method, such as "get MetaData( ) method," where such metadata is stored in a data dictionary or system catalog of the metadata model.

In one embodiment, such materialized views stored in database 105 may be associated with a timestamp corresponding to the time that the materialized view was created, edited, updated, etc. In one embodiment, data access engine 204 is configured to determine if a materialized view was generated within a designated time frame (e.g., generated within the past 30 days) based on determining the difference between the current time to the time of the timestamp and then comparing such a difference to the designated time frame, which may be user-selected. "Time frame," as used herein, refers to the duration of time that can occur from the last date that the materialized view was created, edited, updated, etc. and still consider the materialized view to be valid.

If the materialized view is present and was generated within a designated time frame, then data access engine 204 rewrites the query (e.g., SQL request) received by query engine 201 from computing device 101 to query a materialized view using various software tools, including, but not limited to, Power BI®, Cognos® Analytics, Oracle® Business Intelligence Enterprise Edition, Sisense Fusion® Analytics, etc. In one embodiment, such a query is translated or rewritten by translating the virtual fact query (translating the fact data of the query, such as sales price, sale quantity, etc.) into a materialized view definition. For example, the query may now include a materialized view request, such as the SQL statement of CREATE MATERIALIZED VIEW.

Data access engine 204 then sends the translated or rewritten query to materialized storage database 105 to be processed to obtain the materialized object associated with the query.

If, however, the materialized view is not present or if the materialized view is present but not generated within the designated time frame, then data access engine 204 sends the query to original data storage database 106 to be processed. In such a scenario, the query (e.g., SQL request) is sent directly to the actual database tables of original data storage database 106 without any modification to retrieve and report the appropriate information from original data storage database 106.

A further description of these and other functions is provided below in connection with the discussion of the method for improving the performance for retrieving and reporting information from a data warehouse, such as data warehouse 104.

Prior to the discussion of the method for improving the performance for retrieving and reporting information from data warehouse 104, a description of the hardware configuration of database management system 102 is provided below in connection with FIG. 3.

Figure 3:
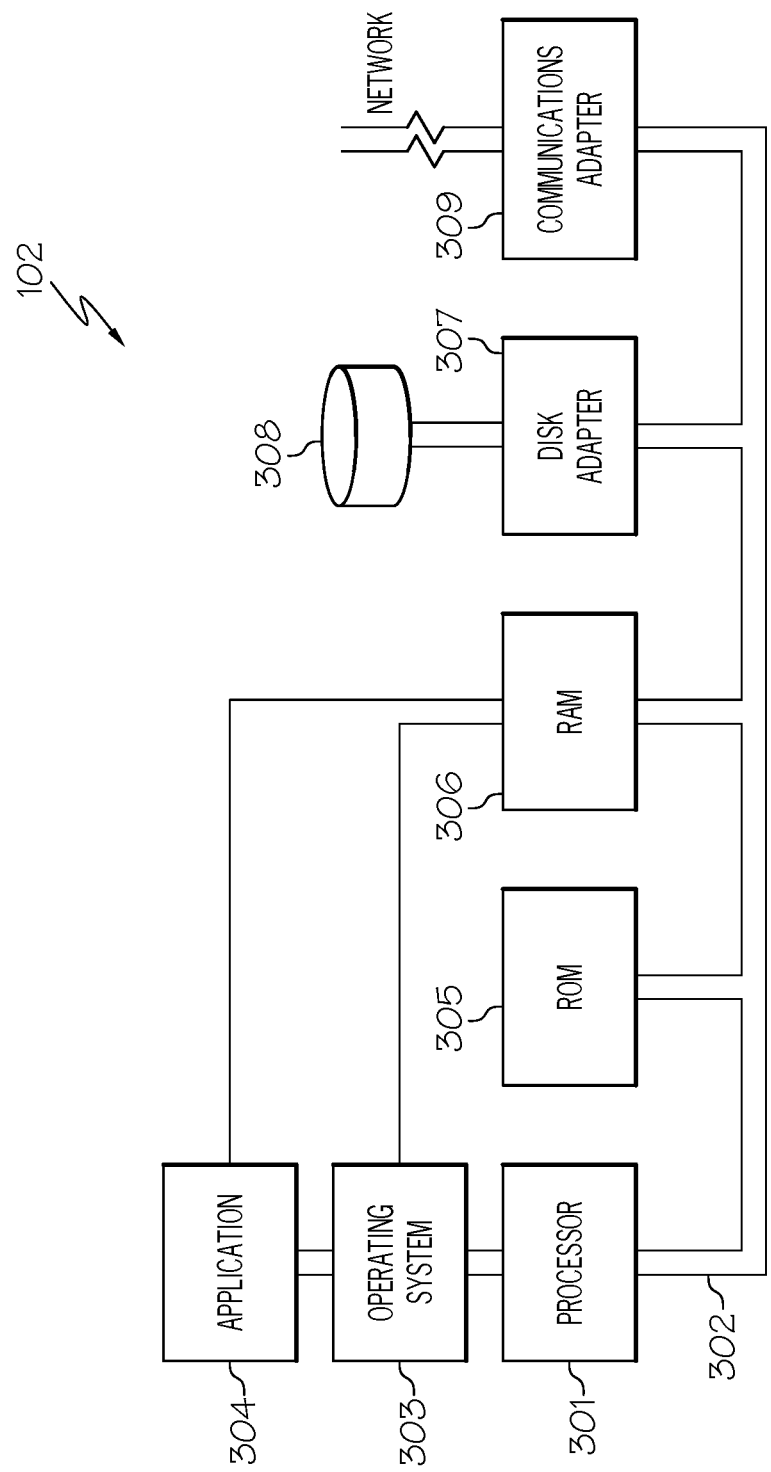
FIG. 3 illustrates an embodiment of the present disclosure of the hardware configuration of the database management system which is representative of a hardware environment for practicing the present disclosure.

Referring now to FIG. 3, FIG. 3 illustrates an embodiment of the present disclosure of the hardware configuration of database management system 102 (FIG. 1) which is representative of a hardware environment for practicing the present disclosure.

Database management system 102 has a processor 301 connected to various other components by system bus 302. An operating system 303 runs on processor 301 and provides control and coordinates the functions of the various components of FIG. 3. An application 304 in accordance with the principles of the present disclosure runs in conjunction with operating system 303 and provides calls to operating system 303 where the calls implement the various functions or services to be performed by application 304. Application 304 may include, for example, query engine 201 (FIG. 2), converter module 202 (FIG. 2), replication service 203 (FIG. 2) and data access engine 204 (FIG. 2). Furthermore, application 304 may include, for example, a program for improving the performance for retrieving and reporting information from data warehouse 104 (FIG. 1) as discussed further below in connection with FIGS. 4-5.

Referring again to FIG. 3, read-only memory ("ROM") 305 is connected to system bus 302 and includes a basic input/output system ("BIOS") that controls certain basic functions of database management system 102. Random access memory ("RAM") 306 and disk adapter 307 are also connected to system bus 302. It should be noted that software components including operating system 303 and application 304 may be loaded into RAM 306, which may be database management system's 102 main memory for execution. Disk adapter 307 may be an integrated drive electronics ("IDE") adapter that communicates with a disk unit 308, e.g., disk drive. It is noted that the program for improving the performance for retrieving and reporting information from data warehouse 104, as discussed further below in connection with FIGS. 4-5, may reside in disk unit 308 or in application 304.

Database management system 102 may further include a communications adapter 309 connected to bus 302. Communications adapter 309 interconnects bus 302 with an outside network (e.g., network 103 of FIG. 1) to communicate with other devices, such as computing device 101 (FIG. 1).

In one embodiment, application 304 of database management system 102 includes the software components of query engine 201, converter module 202, replication service 203 and data access engine 204. In one embodiment, such components may be implemented in hardware, where such hardware components would be connected to bus 302. The functions discussed above performed by such components are not generic computer functions. As a result, database management system 102 is a particular machine that is the result of implementing specific, non-generic computer functions.

In one embodiment, the functionality of such software components (e.g., query engine 201, converter module 202, replication service 203 and data access engine 204) of database management system 102, including the functionality for retrieving and reporting information from data warehouse 104, may be embodied in an application specific integrated circuit.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated above, to improve the performance of retrieving and reporting information stored in the databases of the data warehouse using the metadata model, an extract, transform and load (ETL) process may be used to extract, transform and load data into the star schema, especially for data that does not change that much. The ETL process is a general procedure of copying data from one or more sources into a destination system which represents the data differently from the source(s) or in a different context than the source(s). Data extraction involves extracting data from homogeneous or heterogeneous sources; data transformation involves processing data by data cleaning and transforming it into a proper storage format/structure for the purposes of querying and analysis; finally, data loading describes the insertion of data into the final target database, such as a database of the data warehouse. Over the years, enterprises or organizations have developed relational data warehouses using the metadata model and star schema as discussed above without utilizing the ETL process. One of the reasons that enterprises or organizations have not utilized the ETL process is due to the investment cost. As a result of not utilizing the ETL process though, performance of retrieving and reporting information stored in the databases of the data warehouse has suffered. Unfortunately, there is not currently a data warehouse framework for high performance reporting of data stored in the data warehouse without requiring the investment of the ETL process.

Figure 4:
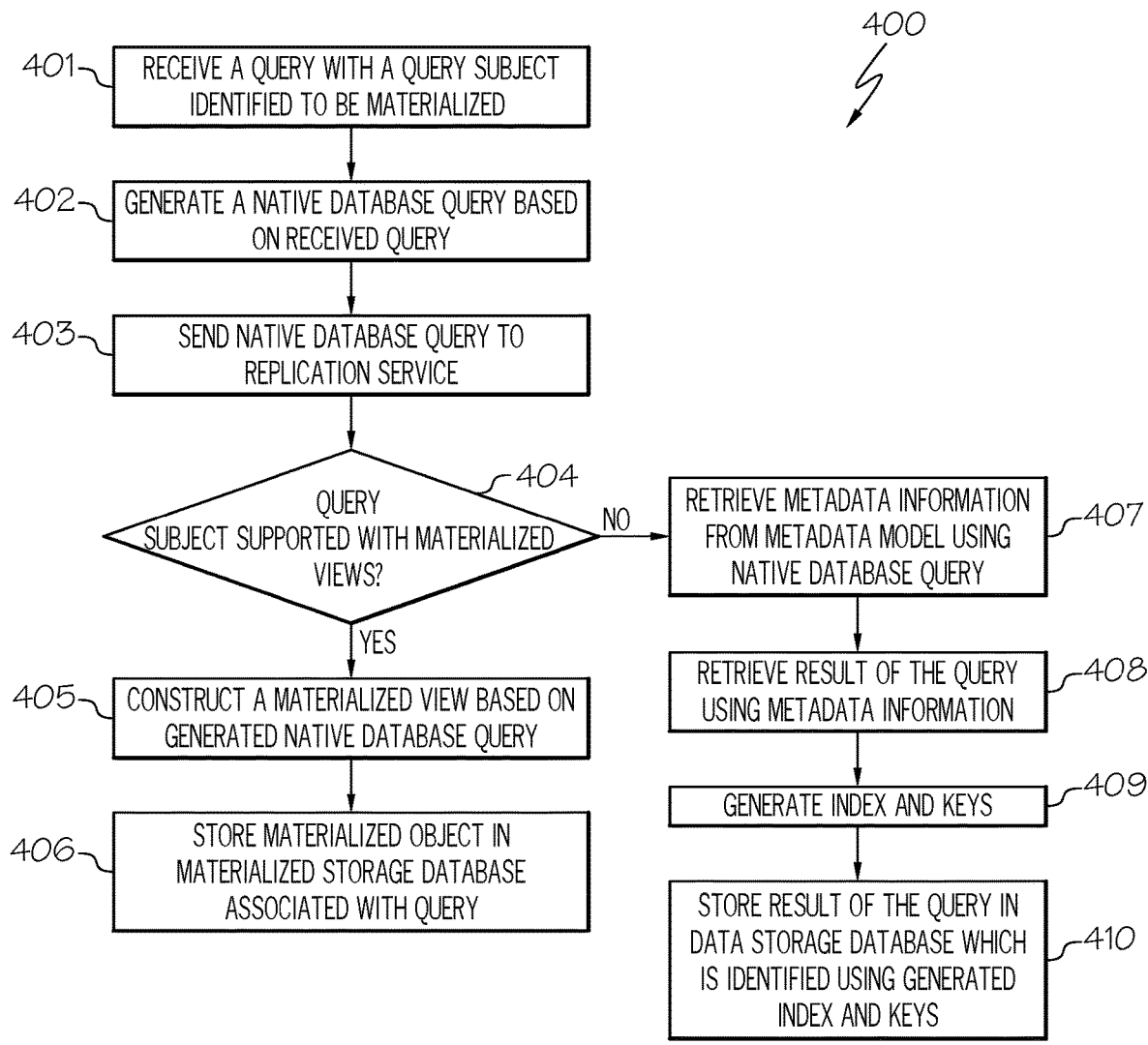
FIG. 4 is a flowchart of a method for populating the materialized storage database and the original data storage database in accordance with an embodiment of the present disclosure.
Figure 5:
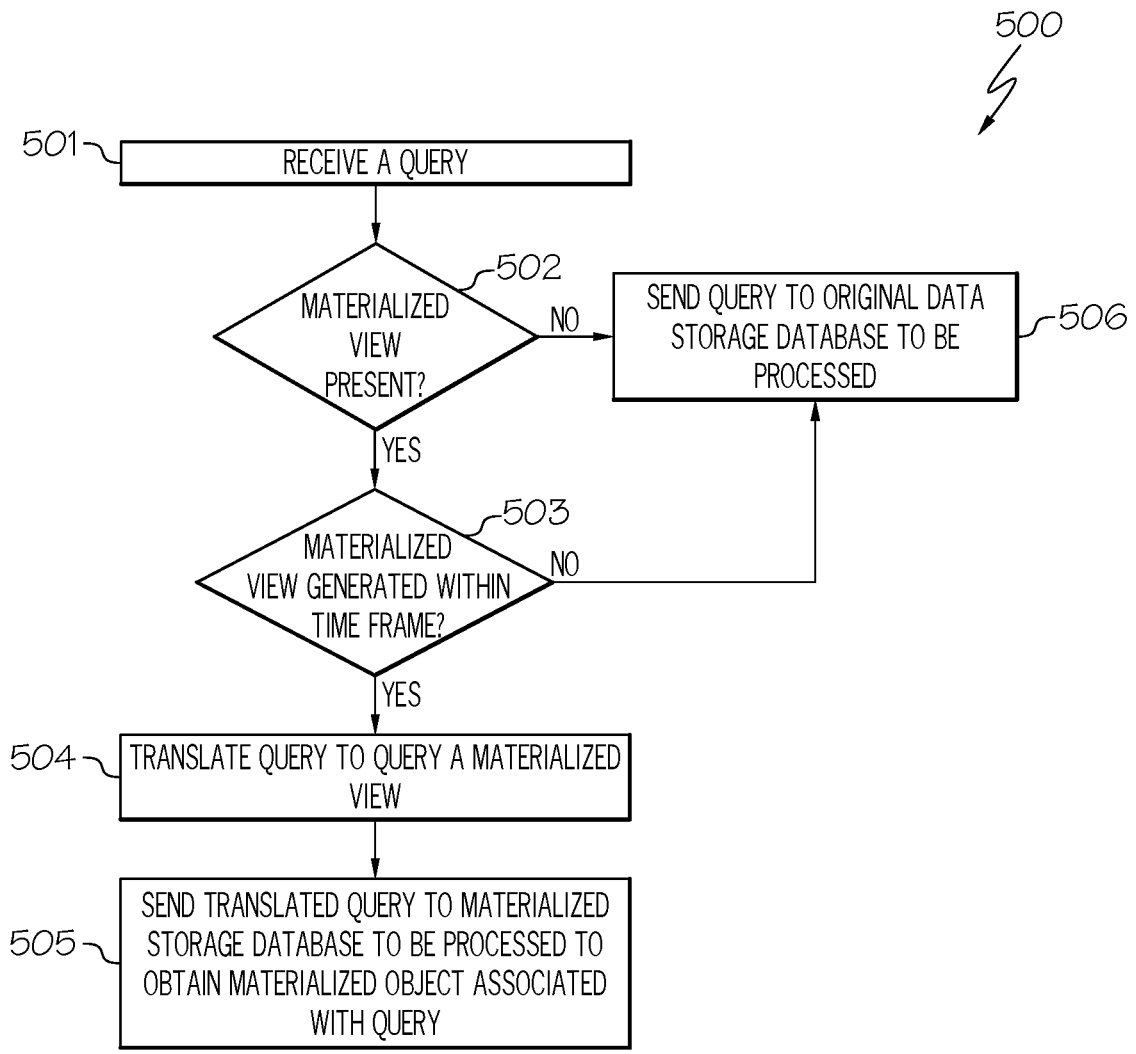
FIG. 5 is a flowchart of a method for improving the performance for retrieving and reporting information from the data warehouse in accordance with an embodiment of the present disclosure.

The embodiments of the present disclosure provide a means for enabling a data warehouse framework for high performance reporting of data stored in the data warehouse without requiring the investment of the ETL process as discussed below in connection with FIGS. 4-5. FIG. 4 is a flowchart of a method for populating the materialized storage database and the original data storage database. FIG. 5 is a flowchart of a method for improving the performance for retrieving and reporting information from the data warehouse.

As stated above, FIG. 4 is a flowchart of a method 400 for populating materialized storage database 105 (FIG. 1) and original data storage database 106 (FIG. 1) in accordance with an embodiment of the present disclosure.

Referring to FIG. 4, in conjunction with FIGS. 1-3, in operation 401, query engine 201 of database management system 102 receives a query from computing device 101 with a query subject identified to be materialized.

As discussed above, in one embodiment, such a query may include a data source query subject (or simply referred to herein as "query subject") which is identified to be materialized by query engine 201. A "query subject," as used herein, is defined by SQL statements that describe how to retrieve data from the data source. In one embodiment, such query subjects directly reference data in a single data source.

In one embodiment, a query subject is a set of query items that have an inherent relationship. A query item is the smallest object in the model that can be placed in a report. It represents a single instance of something, such as the date that a product was introduced.

In one embodiment, query subjects may be modified to optimize and customize the data that they retrieve by adding filters, determinants or relationships.

In one embodiment, query engine 201 identifies the data source query subject to be materialized using various software tools, including, but not limited to, Cognos® Analytics, Oracle® Analytics, Sisense®, Zoho Analytics®, etc.

In operation 402, converter module 202 of database management system 102 generates a native database query based on the query received by query engine 201 in operation 401.

As stated above, a "native database query," as used herein, refers to the actual SQL queries (referring to the actual database objects). Such native database queries are the SQL statements which can be directly executed in the database of data warehouse 104.

In one embodiment, converter module 202 converts the query received by query engine 201 into a native database query using various software tools, including, but not limited to, Power BI®, Cognos® Analytics, Oracle® Business Intelligence Enterprise Edition, Sisense Fusion® Analytics, etc.

In operation 403, converter module 202 of database management system 102 sends the native database query to replication service 203 of database management system 102.

In operation 404, replication service 203 of database management system 102 determines whether the query subject of the query (query received by query engine 201 in operation 401) is supported with materialized views.

As discussed above, in one embodiment, such a determination is based on the query subject which describes how to retrieve data from the data source. Such a query subject may contain statements (e.g., clauses, object types, column aliases, etc.) which may or may not be supported with materialized views. For example, logging_clause, table_compression, and table_partitioning_clause are supported with materialized views; whereas, index_org_table_clause, object_type_col_properties and LOB_storage_clause are not supported with materialized views. In one embodiment, a listing of statements along with an indication as to whether they are or are not supported with materialized views is stored in a data structure (e.g., table). In one embodiment, replication service 203 performs a look-up in such a data structure using natural language processing for terms that match the statements in the query. Upon identifying such a match in the data structure, replication service 203 then determines whether such statements are supported with materialized views. In one embodiment, such a data structure is populated by an expert. In one embodiment, such a data structure is stored in a storage device (e.g., memory 305, disk unit 308) of database management system 102.

Replication service 203 utilizes various software tools to make such a determination including, but not limited to, Cognos® Analytics, Oracle® Analytics, Sisense®, Zoho Analytics®, etc.

If the query subject to be materialized is supported with materialized views, then, in operation 405, replication service 203 of database management system 102 constructs a materialized view based on the native database query generated by converter module 202.

As previously discussed, a "materialized view" (or "materialized object"), as used herein, is a database object that contains the results of a query. For example, it may be a local copy of data located remotely or may be a subset of the rows and/or columns of a table or join result or may be a summary using an aggregate function. As a result, replication service 203 is configured to obtain the results of the query received by query engine 201 from computing device 101, such as by having the native database query executed by the database (e.g., database 106) of data warehouse 104. For example, the native database query may consist of SQL statements which are then executed by the database (e.g., database 106) of data warehouse 104. Upon obtaining the results from executing the native database query, such results are then contained in a database object (materialized object) by replication service 203.

In one embodiment, replication service 203 constructs such a materialized view using various software tools, including, but not limited to, Cognos® Analytics, Oracle® Analytics, Sisense®, Zoho Analytics®, FlexViews, etc.

In operation 406, replication service 203 of database management system 102 stores the query result contained in a database object (materialized object) in materialized storage database 105 along with the associated query (such as the query subject) or the metadata of the query (e.g., identifier, facts, attributes) to enable a more efficient access, especially in data warehousing scenarios, where frequent queries of the actual base tables of the databases can be expensive. That is, replication service 203 of database management system 102 stores the constructed materialized view in materialized storage database 105 along with the associated query (such as the query subject) or the metadata of the query (e.g., identifier, facts, attributes) to enable a more efficient access, especially in data warehousing scenarios, where frequent queries of the actual base tables of the databases can be expensive. By storing such materialized views ("materialized objects") in materialized storage database 105, the results of the query received by query engine 201 from computing device 101 may be retrieved and reported in a more efficient, quicker manner for those queries where a materialized view is present. In this manner, the complex query planning of the metadata model is avoided. Furthermore, the ETL investment is avoided by essentially reverse engineering the ETL logic from the metadata model.

Referring to operation 404, if, on the other hand, the identified query subject to be materialized is not supported with materialized views, then, in operation 407, replication service 203 of database management system 102 retrieves the metadata information pertaining to the query subject from the metadata model using the native database query.

As previously discussed, such metadata information may include identifiers, facts (e.g., metrics, measures, indicators or other data that can be aggregated, such as sales numbers), attributes (provides the context in which facts can be usefully viewed, such as time or location), etc. In one embodiment, such metadata information is obtained by replication service 203 calling a method, such as "get MetaData( ) method," where such metadata is stored in a data dictionary or system catalog of the metadata model.

In operation 408, replication service 203 of database management system 102 retrieves the result of the query using the metadata information.

As discussed above, in connection with such metadata information, replication service 203 retrieves the result of the query, such as a report composed of a combination of facts and attributes from the metadata information, which is stored in data storage database 106.

In operation 409, replication service 203 of database management system 102 generates an index and keys.

As stated above, a key is used to uniquely identify a row in a table of database 106. An index is used to sort or group the rows in the table of database 106. In one embodiment, replication service 203 retrieves the metadata information from the metadata model, generates an index and keys as well as inserts the results of the query into data storage database 106 using various software tools, including, but not limited to, Cognos® Analytics, Oracle® Analytics, Sisense®, Zoho Analytics®, MySQL®, etc. In one embodiment, such indexes and keys can be generated by replication service 203 using SQL statements, such as the SQL Create Index statement and the SQL Primary Key statement.

In operation 410, replication service 203 of database management system 102 stores the result of the query in data storage database 106, which is identified using the index and keys generated by replication service 203.

As discussed above, in one embodiment, replication service 203 retrieves the metadata information from the metadata model, generates an index and keys as well as inserts the results of the query into data storage database 106 using various software tools, including, but not limited to, Cognos® Analytics, Oracle® Analytics, Sisense®, Zoho Analytics®, MySQL®, etc.

Upon populating databases 105, 106 of data warehouse 104, newly received queries from computing devices 101 may be handled in a manner that enables high performance of the reporting of data stored in data warehouse 104 without requiring the investment of the ETL process as discussed below in connection with FIG. 5.

FIG. 5 is a flowchart of a method 500 for improving the performance for retrieving and reporting information from data warehouse 104 (FIG. 1) in accordance with an embodiment of the present disclosure.

Referring to FIG. 5, in conjunction with FIGS. 1-4, in operation 501, query engine 201 of database management system 102 receives a query (e.g., SQL query) from computing device 101.

In operation 502, data access engine 204 of database management system 102 determines whether a materialized view is present.

As discussed above, in one embodiment, data access engine 204 is configured to determine if a materialized view is present in materialized storage database 105 based on matching the received query (such as the query subject) or the metadata of the received query (e.g., identifier, facts, attributes) with the query and/or metadata stored in database 105 that is associated with previously stored materialized views. As previously discussed, such metadata may be obtained from the metadata model. Furthermore, as previously discussed, materialized views may be stored in materialized storage database 105 along with its associated query (e.g., query subject) and/or metadata of such a query. By matching the query (e.g., query subject) and/or metadata of the received query with such stored queries or metadata, the associated materialized views may be identified. In one embodiment, such matching may be accomplished by data access engine 204 using natural language processing.

In one embodiment, data access engine 204 identifies the query subject of the query using various software tools, including, but not limited to, Cognos® Analytics, Oracle® Analytics, Sisense®, Zoho Analytics®, etc. Furthermore, in one embodiment, data access engine 204 is configured to identify the metadata of the query by calling a method, such as "get MetaData( ) method," where such metadata is stored in a data dictionary or system catalog of the metadata model.

If a materialized view is present, then, in operation 503, data access engine 204 of database management system 102 determines whether the materialized view was generated within the designated time frame.

As stated above, in one embodiment, such materialized views stored in database 105 may be associated with a timestamp corresponding to the time that the materialized view was created, edited, updated, etc. In one embodiment, data access engine 204 is configured to determine if a materialized view was generated within a designated time frame (e.g., generated within the past 30 days) based on determining the difference between the current time to the time of the timestamp and then comparing such a difference to the designated time frame, which may be user-selected. "Time frame," as used herein, refers to the duration of time that can occur from the last date that the materialized view was created, edited, updated, etc. and still consider the materialized view to be valid.

If the materialized view is present and was generated within the designated time frame, then, in operation 504, data access engine 204 of database management system 102 translates the query to query a materialized view. That is, data access engine 204 rewrites the query (e.g., SQL request) received by query engine 201 from computing device 101 to query a materialized view using various software tools, including, but not limited to, Power BI®, Cognos® Analytics, Oracle® Business Intelligence Enterprise Edition, Sisense Fusion® Analytics, etc. In one embodiment, such a query is rewritten by translating the virtual fact query (translating the fact data of the query, such as sales price, sale quantity, etc.) into a materialized view definition. For example, the query may now include a materialized view request, such as the SQL statement of CREATE MATERIALIZED VIEW.

In operation 505, data access engine 204 of database management system 102 sends the translated query (rewritten query) to materialized storage database 105 to be processed to obtain the materialized object associated with the query.

Referring to operations 502 and 503, if, however, the materialized view is not present or if the materialized view is present but not generated within the designated time frame, then, in operation 506, data access engine 204 of database management system 102 sends the query to original data storage database 106 to be processed. In such a scenario, the query (e.g., SQL request) is sent directly to the actual database tables of original data storage database 106 without any modification to retrieve and report the appropriate information from original data storage database 106.

As a result of the foregoing, embodiments of the present disclosure provide a means for enabling a data warehouse framework for high performance reporting of data stored in the data warehouse without requiring the investment of the ETL process. Using the principles of the present disclosure, the complex query planning of the metadata model is avoided. Furthermore, the ETL investment is avoided by essentially reverse engineering the ETL logic from the metadata model.

Furthermore, the principles of the present disclosure improve the technology or technical field involving data warehouses. As discussed above, to improve the performance of retrieving and reporting information stored in the databases of the data warehouse using the metadata model, an extract, transform and load (ETL) process may be used to extract, transform and load data into the star schema, especially for data that does not change that much. The ETL process is a general procedure of copying data from one or more sources into a destination system which represents the data differently from the source(s) or in a different context than the source(s), Data extraction involves extracting data from homogeneous or heterogeneous sources; data transformation involves processing data by data cleaning and transforming it into a proper storage format/structure for the purposes of querying and analysis; finally, data loading describes the insertion of data into the final target database, such as a database of the data warehouse. Over the years, enterprises or organizations have developed relational data warehouses using the metadata model and star schema as discussed above without utilizing the ETL process. One of the reasons that enterprises or organizations have not utilized the ETL process is due to the investment cost. As a result of not utilizing the ETL process though, performance of retrieving and reporting information stored in the databases of the data warehouse has suffered. Unfortunately, there is not currently a data warehouse framework for high performance reporting of data stored in the data warehouse without requiring the investment of the ETL process.

Embodiments of the present disclosure improve such technology by receiving a query (e.g., SQL query). A determination is then made as to whether a materialized view is present and, if so, if the materialized view was generated within a designated time frame (e.g., generated within the past 30 days), which may be user-specified. A "materialized view" (or "materialized object"), as used herein, is a database object that contains the results of a query. For example, it may be a local copy of data located remotely or may be a subset of the rows and/or columns of a table or join result or may be a summary using an aggregate function. In one embodiment, the presence of a materialized view is determined based on matching the received query (such as the query subject) and/or the metadata of the received query (e.g., identifier, facts, attributes) with the query (such as the query subject) and/or metadata stored in a database (referred to herein as the "materialized storage database") of the data warehouse that stores materialized views associated with such stored queries and/or metadata. If a materialized view is present, and if such a materialized view was generated within the designated time frame, then the query is translated to query a materialized view. In one embodiment, such a translation involves translating the virtual fact query (translating the fact data of the query, such as sales price, sale quantity, etc.) into a materialized view definition. The translated query is then sent to the materialized storage database to be processed to obtain the materialized object associated with the query. If, on the other hand, the materialized view is not present, or the materialized view is present but has not been generated within the designated time frame, then the query is sent to the data storage database of the data warehouse (referred to herein as the "original data storage database"), which stores the original data, to be processed. In such a scenario, the query (e.g., SQL request) is sent directly to the actual database tables of the original data storage database without any modification to retrieve and report the appropriate information from the original data storage database. In this manner, a data warehouse framework for high performance reporting of data stored in the data warehouse without requiring the investment of the ETL process is provided. Furthermore, in this manner, there is an improvement in the technical field involving data warehouses.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for improving performance for retrieving and reporting information from a data warehouse, the method comprising:
    receiving a query;
    translating said query to query a materialized view in response to a presence of said materialized view and in response to said materialized view being generated within a designated time frame;
    sending said translated query to a first data storage of said data warehouse to be processed to obtain a materialized object associated with said query in response to said presence of said materialized view and in response to said materialized view being generated within said designated time frame; and
    sending said query to a second data storage of said data warehouse to be processed in response to a lack of said presence of said materialized view or in response to said materialized view not being generated within said designated time frame.

2. The method as recited in claim 1 further comprising:
    receiving a query with a query subject identified to be materialized; and
    generating a native database query based on said received query with said query subject identified to be materialized.

3. The method as recited in claim 2 further comprising:
    sending said native database query to a replication service.

4. The method as recited in claim 3 further comprising:
    constructing a materialized view based on said generated native database query in response to said query subject being supported with materialized views.

5. The method as recited in claim 4 further comprising:
    saving said constructed materialized view in said first data storage.

6. The method as recited in claim 2 further comprising:
    retrieving metadata information from a metadata model using said generated native database query in response to said query subject not being supported with materialized views.

7. The method as recited in claim 6 further comprising:
    retrieving a result of said query with said query subject identified to be materialized using said metadata information;
    generating an index and keys; and
    storing said result of said query with said query subject identified to be materialized in said second data storage which is identified using said generated index and keys.

8. A computer program product for improving performance for retrieving and reporting information from a data warehouse, the computer program product comprising one or more computer readable storage mediums having program code embodied therewith, the program code comprising programming instructions for:
    receiving a query;
    translating said query to query a materialized view in response to a presence of said materialized view and in response to said materialized view being generated within a designated time frame;
    sending said translated query to a first data storage of said data warehouse to be processed to obtain a materialized object associated with said query in response to said presence of said materialized view and in response to said materialized view being generated within said designated time frame; and
    sending said query to a second data storage of said data warehouse to be processed in response to a lack of said presence of said materialized view or in response to said materialized view not being generated within said designated time frame.

9. The computer program product as recited in claim 8, wherein the program code further comprises the programming instructions for:
    receiving a query with a query subject identified to be materialized; and
    generating a native database query based on said received query with said query subject identified to be materialized.

10. The computer program product as recited in claim 9, wherein the program code further comprises the programming instructions for:
    sending said native database query to a replication service.

11. The computer program product as recited in claim 10, wherein the program code further comprises the programming instructions for:
    constructing a materialized view based on said generated native database query in response to said query subject being supported with materialized views.

12. The computer program product as recited in claim 11, wherein the program code further comprises the programming instructions for:
    saving said constructed materialized view in said first data storage.

13. The computer program product as recited in claim 9, wherein the program code further comprises the programming instructions for:
    retrieving metadata information from a metadata model using said generated native database query in response to said query subject not being supported with materialized views.

14. The computer program product as recited in claim 13, wherein the program code further comprises the programming instructions for:
    retrieving a result of said query with said query subject identified to be materialized using said metadata information;
    generating an index and keys; and
    storing said result of said query with said query subject identified to be materialized in said second data storage which is identified using said generated index and keys.

15. A system, comprising:
    a memory for storing a computer program for improving performance for retrieving and reporting information from a data warehouse; and a processor connected to said memory, wherein said processor is configured to execute program instructions of the computer program comprising:
- receiving a query;
- translating said query to query a materialized view in response to a presence of said materialized view and in response to said materialized view being generated within a designated time frame;
- sending said translated query to a first data storage of said data warehouse to be processed to obtain a materialized object associated with said query in response to said presence of said materialized view and in response to said materialized view being generated within said designated time frame; and
- sending said query to a second data storage of said data warehouse to be processed in response to a lack of said presence of said materialized view or in response to said materialized view not being generated within said designated time frame.

16. The system as recited in claim 15, wherein the program instructions of the computer program further comprise:
- receiving a query with a query subject identified to be materialized; and
- generating a native database query based on said received query with said query subject identified to be materialized.

17. The system as recited in claim 16, wherein the program instructions of the computer program further comprise:
- sending said native database query to a replication service.

18. The system as recited in claim 17, wherein the program instructions of the computer program further comprise:
- constructing a materialized view based on said generated native database query in response to said query subject being supported with materialized views.

19. The system as recited in claim 18, wherein the program instructions of the computer program further comprise:
- saving said constructed materialized view in said first data storage.

20. The system as recited in claim 16, wherein the program instructions of the computer program further comprise:
- retrieving metadata information from a metadata model using said generated native database query in response to said query subject not being supported with materialized views.

* * * * *